United States Patent
Salvatore et al.

(10) Patent No.: US 6,776,372 B2
(45) Date of Patent: Aug. 17, 2004

(54) METHOD OF OPERATING A SATELLITE FOR END-OF-LIFE MANEUVERS

(75) Inventors: Jeremiah Salvatore, Redondo Beach, CA (US); Stephen C. Jennings, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 33 days.

(21) Appl. No.: 10/255,540

(22) Filed: Sep. 26, 2002

(65) Prior Publication Data

US 2004/0061028 A1 Apr. 1, 2004

(51) Int. Cl.[7] .............................. B64G 1/22
(52) U.S. Cl. .................. 244/135 C; 244/172
(58) Field of Search ............ 244/135 C, 169, 244/158 R, 172, 164, 135 R

(56) References Cited

U.S. PATENT DOCUMENTS

| | | | | |
|---|---|---|---|---|
| 2,840,097 A | * | 6/1958 | Farkas | |
| 4,923,152 A | * | 5/1990 | Barkats | |
| 4,987,775 A | * | 1/1991 | Chobotov | |
| 5,058,834 A | * | 10/1991 | Hubert | |
| 5,143,328 A | * | 9/1992 | Leonard | |
| 5,158,362 A | * | 10/1992 | Brauer et al. | |
| 5,251,852 A | * | 10/1993 | Pulkowski et al. | |
| 5,660,358 A | * | 8/1997 | Grafwallner et al. | |
| 6,024,328 A | | 2/2000 | Ellison | |
| 6,113,035 A | * | 9/2000 | Hubert | |
| 6,125,882 A | * | 10/2000 | Kong | |
| 6,135,393 A | * | 10/2000 | Sackheim et al. | |

* cited by examiner

*Primary Examiner*—Tien Dinh
(74) *Attorney, Agent, or Firm*—Terje Gudmestad

(57) ABSTRACT

A method for operating a satellite (10, 34) so that a predetermined amount of fuel is left to perform end-of-life maneuvers is provided. A first pressure differential is established between a first propellant tank (74) and a second propellant tank (76). Propellant is transferred from the first tank (74) to the second tank (76). The second tank is used for orbit maintenance. The first tank is used for end-of-life maneuvers. Propellant may be transferred between the tanks using a latching process so that a predetermined amount of fuel may be transferred from a non-empty tank to a full tank. Another way in which the propellant may be measured is to equalize the amount of propellant in each tank and using one tank to completion so the amount remaining is known.

19 Claims, 2 Drawing Sheets

.US 6,776,372 B2

1

METHOD OF OPERATING A SATELLITE FOR END-OF-LIFE MANEUVERS

TECHNICAL FIELD

The present invention relates to a method for controlling the operation of a satellite and, more particularly, to a method for controlling the operation and consumption of fuel of a satellite near the end of its useful life.

BACKGROUND ART

Spacecraft propulsion systems typically use at least two tanks that store propellant therein. The propellant is used to maintain the satellite orbit due to various perturbations in space. A small amount of fuel is required to maintain an orbit. When a satellite nears the end of its fuel, the satellite may be placed in a graveyard orbit.

A standard method for determining the propellants on a spacecraft in orbit is to keep track of the propellant by bookkeeping. That is, keeping track of the burn times and thus deducing the amount of fuel used which can be subtracted from the propellant loaded prior to launch. This method is typically no more accurate than one percent of the loaded propellant. This amount may be equivalent to several months of station keeping. Because the spacecraft is deorbited several months before the end of its useful life, potentially millions of dollars in revenue are lost.

The present invention proposes a method that can be used on existing and future spacecraft to predict the amount of fuel therein without incorporating expensive fuel gauge type devices.

SUMMARY OF THE INVENTION

The present invention provides a method for determining an amount of fuel to be saved for end-of-life maneuvers so that the satellite can be controllably deorbited without shortening its regular useful life.

In one aspect of the invention, a method of operating a satellite comprises a method for operating a satellite so that a predetermined amount of fuel is left to perform end-of-life maneuvers. A first pressure differential is established between a first propellant tank and a second propellant tank. Propellant is transferred from the second tank to the first tank. The second tank is used for orbit maintenance. The first tank is used for end-of-life maneuvers. Propellant may be transferred between the tanks using a latching process so that a predetermined amount of fuel may be transferred from an empty tank to a full tank. Another way in which the propellant may be measured is to equalize the amount of propellant in each tank and using one tank to completion so the amount remaining is known.

One advantage of the invention is that the present method may be used both on existing satellites and future satellites. By utilizing the present invention the end-of-life of the satellite is known to within days rather than months. Thus, any remaining station keeping and deorbit maneuvers with the banked (transferred) propellant may be confidently performed. It should be also noted that the present invention applies to both three axis and spin stabilized spacecraft and can be applied to both mono-propellant and bi-propellant propulsion systems.

Other aspects and advantages of the present invention will become apparent upon the following detailed description and appended claims, and upon reference to the accompanying drawings.

2

BEST MODES FOR CARRYING OUT THE INVENTION

Figure 1:
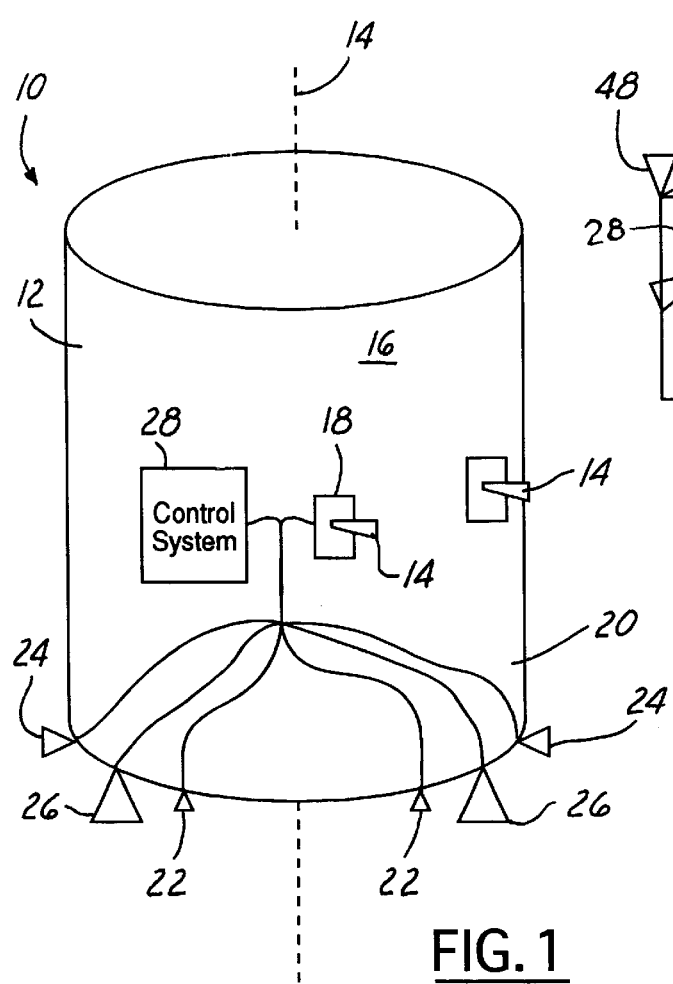
FIG. 1 is a perspective view of a spin stabilized satellite having the control system according to the present invention.

In the following figures the same reference numerals will be used to identify the same components. The present invention may be applied to various types of satellites including spin stabilized and three axis satellites as well as satellites in any orbit. Also, the present invention is applicable to both mono-propellant and bi-propellant systems. Further, the present invention is described with respect to two propellant tanks. However, the present invention may be adapted easily for spacecraft having more than two tanks.

The present invention utilizes a banked amount of propellant that is stored for end-of-life (EOL) maneuvers. Generally, the amount stored for EOL maneuvers may be determined in two ways. First, by controlling latching of valves between the two tanks or, second, by equalizing the amount of fuel in the two tanks and thus calculating the amount in a first tank after the amount of fuel in the second tank is burned.

Referring now to FIG. 1, a spin stabilized satellite 10 has a substantially cylindrical body 12 that is spun about a cylindrical axis 14 for stabilization in orbit. Radial thrusters 14 are positioned on the side surface 16 of cylindrical body 12. Typically, two sets of thrusters pointing in opposite directions are utilized. The side surface of the cylindrical body 12 has cutouts 18 through solar panels 20 to allow the thrusters 14 to protrude therethrough. The rate of spinning is controlled by firing the radial thrusters 14.

Axial thrusters 22 may also be included on the satellite 10. Axial thrusters 22 are fired to control the attitude or orientation of the satellite by adjusting the orientation of its spin axis 14. Canted radial thrusters 24 may also be included on satellite 10. Canted radial thrusters 24 provide spin stabilization. Apogee thrusters 26 may also be provided. Apogee thrusters 26 are used to lift the satellite up from a transfer over to a geosynchronous orbit.

A thruster control system 28 is coupled to the thrusters 14, 22, 24, and 26. Control system 28 as will be further described below may be used to save a predetermined amount of fuel for EOL maneuvers. Control system 28 includes various components including the tanks for storage of the propellant.

Figure 2:
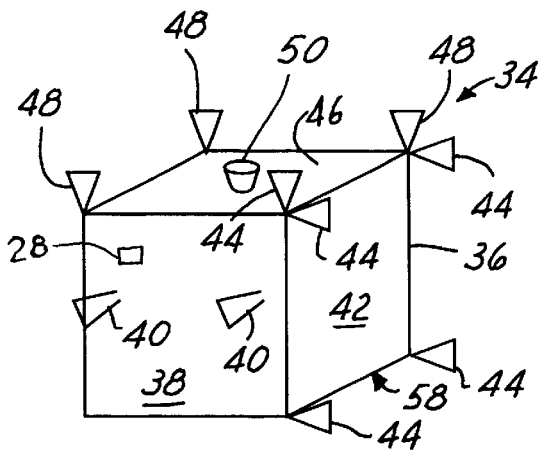
FIG. 2 is a perspective view of a three axis satellite according to the present invention.

Referring now to FIG. 2, a three axis satellite 34 having a satellite body 36 is illustrated. Satellite body 36 is generally a cubicle with six planar surfaces. Two opposite surfaces 38 have two east/west thrusters 40 to adjust the longitude of the satellite in geosynchronous orbit. Another pair of opposite surfaces 42 each have four north/south thrusters 44 positioned near the corners of each surface to adjust the latitude or inclination of the satellite. One of the remaining surfaces 46 has four axial thrusters 48 to control the attitude of the satellite by firing one or more of the thrusters. An apogee thruster 50 is positioned at the center of the surface 46 to propel the satellite from a transfer orbit to a geosynchronous orbit. After the satellite is transferred to the geosynchronous orbit, apogee thruster 50 is disabled.

Figure 3:
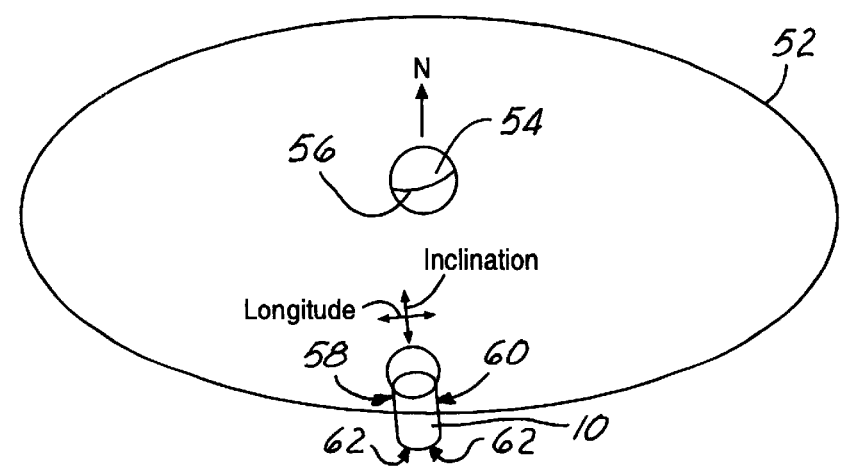
FIG. 3 is a diagram of a satellite in geosynchronous orbit with canted radial and axial thrusters to adjust the satellite's position.

Referring now to FIG. 3, a spin stabilized satellite 10 is illustrated in a geosynchronous orbit 52 around earth 54. The orbit is directly above the equator 56 of earth 54. The north pole of earth 54 is shown as arrow N. To illustrate the longitudinal (east/west) positioning of the satellite by its canted radial thrusters, only two thrusters 58 and 60 are positioned for propelling the satellite to the east and west, respectively. The inclination (north/south) of the satellite 10 can be adjusted by axial or apogee thrusters 62. At the end of its useful life, satellite 10 may be deorbited to vacate its position in geosynchronous orbit 52. Future satellites may thus be placed in its place.

Figure 4:
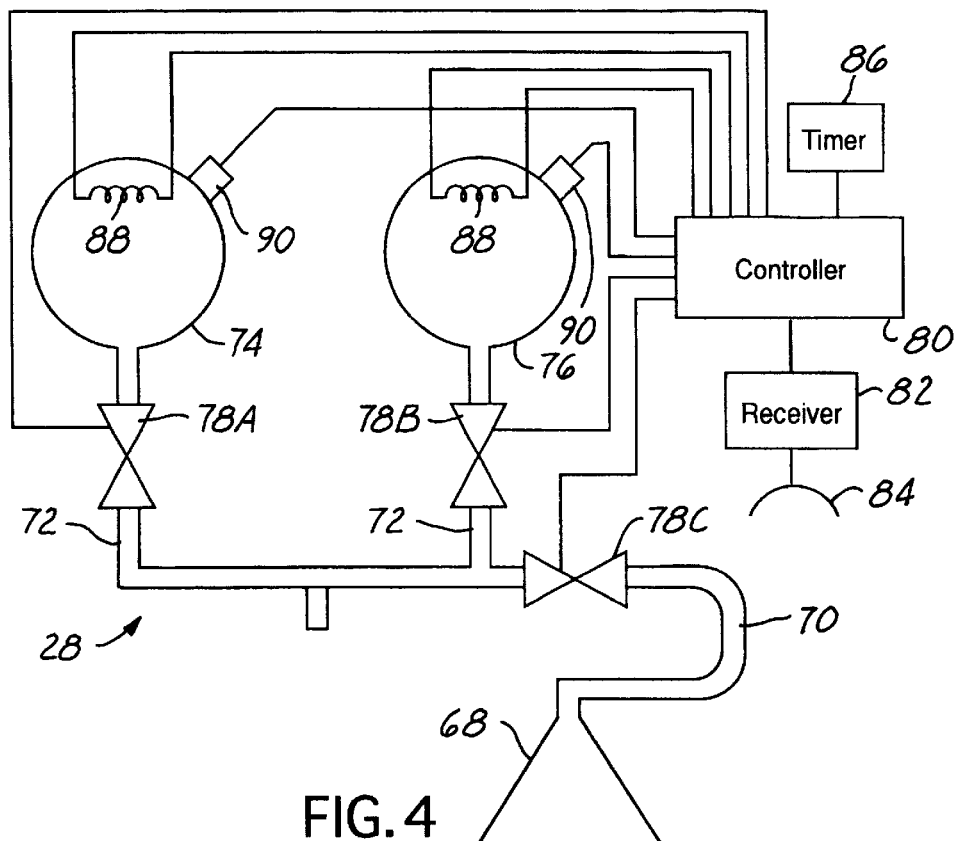
FIG. 4 is a simplified diagrammatic view of a propellant thruster control system according to the present invention.

Referring now to FIG. 4, control system 28 is illustrated in further detail. Control system 28 is shown with a generic thruster 68. Thruster 68 may represent one or a number of the thrusters mentioned in FIGS. 1, 2 or 3. Thruster 68 receives propellant through a main feed tube 70. Secondary tubes 72 are fluidically coupled to main tube 70. Secondary tubes 72 are coupled to a first propellant storage tank 74 and a second propellant storage tank 76. Various controllable latch valves 78A, 78B, and 78C may be disposed within main feed tubes 70 and secondary feed tubes 72 to control the release of propellant. A controller 80 that is preferably microprocessor-based is included within control system 28. Controller 80 may be coupled to a satellite receiver 82 which in turn is coupled to a receiving antenna 84. Controller 80 acts according to preprogrammed sequences and in response to commands received through antenna 84 and receiver 82.

Controller 80 may be coupled to latch valve 78A, 78B, and 78C. Thus, controller 80 may control the operation, i.e., the opening and closing of the latch valves. Various types of latch valves are known to those skilled in the art. Preferably, the opening and closing of the latch valves may be timed by a timer 86 that may be integral to controller 80.

Controller 80 may also be coupled to heaters 88. Controller 80 can control the operation of heaters 88 to increase the pressure within tank 74, 76. Various types of heaters would be evident to those skilled in the art.

Controller 80 may also be coupled to pressured transducers 90 that generate pressure signals corresponding to the pressure in their respective propellant tanks.

Figure 5:
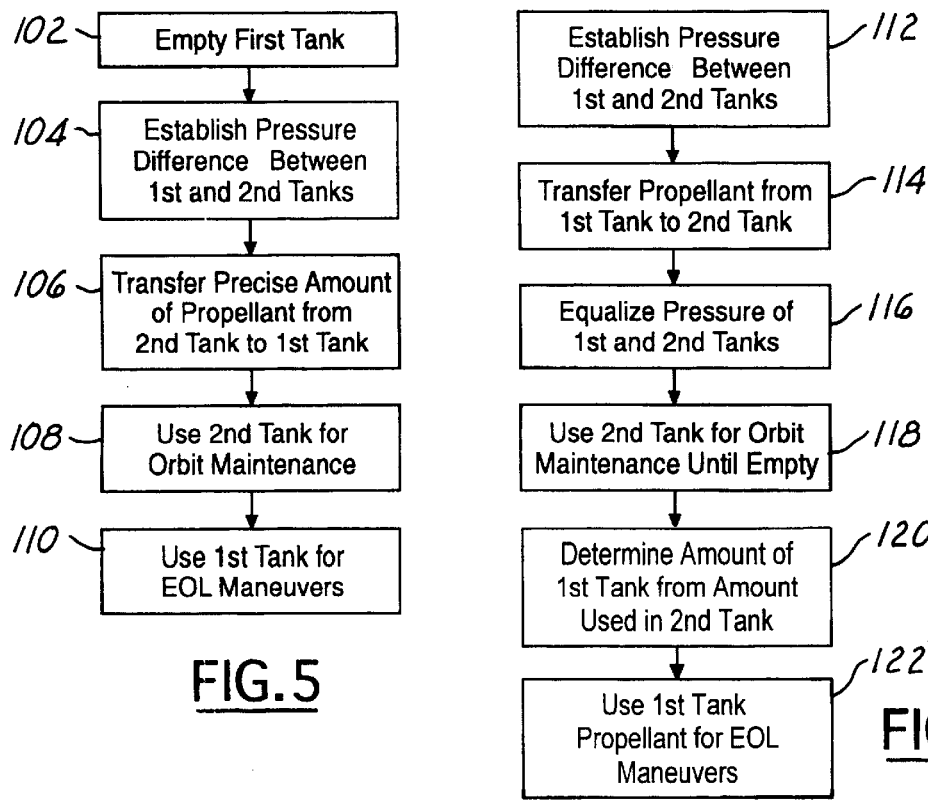
FIG. 5 is a block diagram of a first method for operating a satellite according to the present invention.

Referring now to FIG. 5, the first of two embodiments of the present invention is described in further detail. In step 102, the first tank is emptied by burning to completion all the propellant therein. By controlling the latches, a pressure difference may be established between the first tank and second tank in step 104. In step 106, a precise amount of propellant is transferred from the second tank to the first tank that was previously emptied in step 102. A precise amount may be established by timing the opening and closing of the latch valves and thus controlling the flow through manifolds between the tanks. Transfer may be directly observable by the pressure in both tanks being measured by the pressure transducers. In one step 108 the portion of the second tank remaining may be used for orbit maintenance. In step 110, the first tank may then be used for EOL maneuvers. Because the amount is precisely known, the amount of EOL maneuvers that can be performed is also precisely known. This embodiment may be used for mono-propellant and bi-propellant systems. Typically, more than one tank is provided for each propellant in a bi-propellant system and thus the present invention may be performed on each one of the types of propellants.

Figure 6:
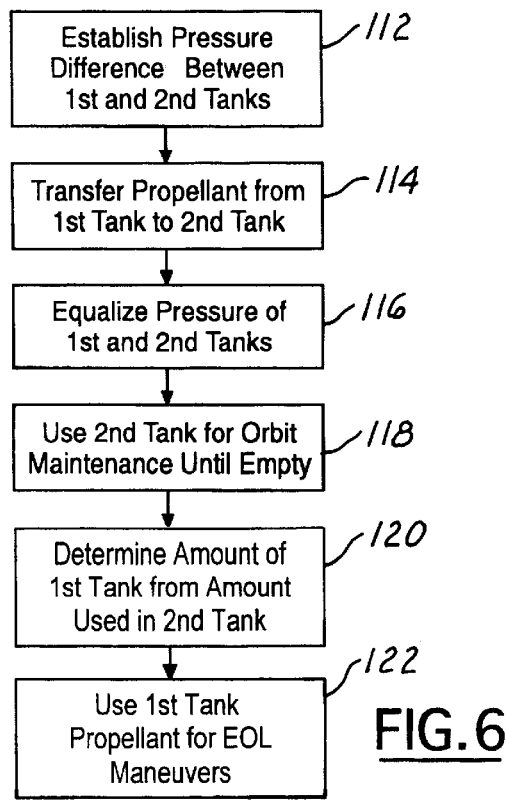
FIG. 6 is a flow chart of a second embodiment of operating a satellite according to the present invention.

Referring now to FIG. 6, a second embodiment of the present invention is illustrated. This embodiment is particularly suitable for spinning spacecraft. Instead of emptying a propellant tank as described in the first embodiment, a pressure difference is established between the first and second tanks in step 112. By opening latch valves between the tanks, the tanks tend to equalize. Propellant is transferred from the first tank to the second tank in response to the pressure difference. Thus, in step 116 the pressure is equalized between the first and second tanks. This implies that the same amount of propellant is in each of the tanks. The equalization process is assisted by the rotational movement of the spacecraft. Of course, this assumes that the spacecraft is balanced when dry and that initial gas pressures in both tanks were equal at loading. The transfer is enabled by opening latch valves between the tanks until the pressures, as read by the pressure transducers, are the same. Of course, pressure equalization may be inferred without pressure transducers after a predetermined amount of time. In step 118 the propellant in one tank is used for orbit maintenance until the tank is empty. In step 120 the amount in the first tank may be inferred from the amount used in the second tank. Knowing the burn times and durations of the fuel from the second tank, the amount of propellant in the first tank is thus known. That is, because each of the tanks had an equal amount of fuel to start, the amount in the closed first tank is known. In step 122 the amount of propellant in the first tank may then be used for EOL maneuvers.

Because more fuel than that required for EOL maneuvers may be remaining in the first tank, the process may be repeated to reduce the amount in the first tank. Also, a similar process to that described in the first embodiment with respect to FIG. 5 may be performed to reduce the amount of fuel in the first tank. The system and method of the present invention may be used for bi-propellant systems. That is, an amount of each propellant may be stored using the method described above. The propellant in a bi-propellant system may be fuel in at least two tanks and oxidizer in at least two tanks.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A method for operating a satellite comprising:
   establishing a pressure differential between a first propellant tank and a second propellant tank;
   transferring propellant from a second tank to a first tank;
   using propellant in the second tank for orbit maintenance; and
   using propellant in the first tank for end-of-life maneuvers.

2. A method as recited in claim 1 wherein establishing a pressure differential comprises heating the second tank.

3. A method as recited in claim 2 wherein heating comprises starting a heater.

4. A method as recited in claim 2 wherein heating comprises orienting the second tank in a predetermined direction.

5. A method as recited in claim 1 wherein establishing a pressure differential comprises, emptying the first tank.

6. A method as recited in claim 5 wherein transferring propellant comprises transferring a known amount.

7. A method as recited in claim 6 wherein transferring a known amount comprises opening latch valves for a predetermined amount of time.

8. A method as recited in claim 1 wherein the first propellant in the first tank is the same as the propellant in the second tank.

9. A method as recited in claim 1 wherein the satellite comprises a three axis satellite.

10. A method as recited in claim 1 wherein the satellite comprises a spinning satellite.

11. A method as recited in claim 1 wherein transferring propellant comprises equalizing pressure between the first tank and the second tank.

12. A method as recited in claim 11 wherein equalizing pressure comprises opening latch valves for a predetermined amount of time.

13. A method as recited in claim 1 wherein using the propellant in the second tank comprises measuring the amount of propellant used in the second tank until the second tank is emptied to determine the amount in the first tank.

14. A method as recited in claim 13 further comprising after using the propellant in the second tank, transferring a portion of the propellant from the first tank to the second tank.

15. A method for operating a satellite having a first propellant tank and a second propellant tank comprising:
    emptying the first tank;
    establishing a pressure differential between a first propellant tank and a second propellant tank;
    transferring a known amount of propellant from the second tank to the first tank by controlling latches therebetween;
    using propellant in the second tank for orbit maintenance; and
    using propellant in the first tank for end-of-life maneuvers.

16. A method as recited in claim 15 wherein establishing a pressure differential comprises heating the second tank.

17. A method for operating a satellite comprising:
    establishing a pressure differential between a first propellant tank and a second propellant tank;
    transferring propellant from a second tank to a first tank to equalize an amount of propellant in the first rank and the second tank;
    using propellant in the second rank for orbit maintenance until the propellant in the second tank is empty;
    calculating a first amount of propellant used from the second tank;
    determining a second amount of propellant in the first tank in response to the first amount; and
    using propellant in the first tank for end-of-life maneuvers.

18. A method as recited in claim 17 wherein transferring propellant comprises spinning the satellite.

19. A method as recited in claim 17 wherein establishing a pressure differential comprises heating the second tank.

* * * * *

UNITED STATES PATENT AND TRADEMARK OFFICE
CERTIFICATE OF CORRECTION

PATENT NO. : 6,776,372 B2  
APPLICATION NO. : 10/255540  
DATED : August 17, 2004  
INVENTOR(S) : Salvatore et al.

Page 1 of 1

It is certified that error appears in the above-identified patent and that said Letters Patent is hereby corrected as shown below:

Column 1,
Line 48, change "an empty tank to a full tank" to -- a non-empty tank to an empty tank --.

Signed and Sealed this

Twentieth Day of June, 2006

JON W. DUDAS  
*Director of the United States Patent and Trademark Office*